United States Patent
Sorrentino et al.

(10) Patent No.: US 9,942,017 B2
(45) Date of Patent: Apr. 10, 2018

(54) MAINTAINING PHASE COHERENCE FOR FREQUENCY OFFSET ESTIMATION

(71) Applicant: Telefonaktiebolaget LM Ericsson (publ), Stockholm (SE)

(72) Inventors: Stefano Sorrentino, Stockholm (SE); David Hammarwall, Stockholm (SE); George Jongren, Stockholm (SE); Yu Yang, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 60 days.

(21) Appl. No.: 14/912,107

(22) PCT Filed: Aug. 16, 2013

(86) PCT No.: PCT/SE2013/050978
§ 371 (c)(1),
(2) Date: Feb. 15, 2016

(87) PCT Pub. No.: WO2015/023220
PCT Pub. Date: Feb. 19, 2015

(65) Prior Publication Data
US 2016/0197712 A1   Jul. 7, 2016

(51) Int. Cl.
*H04L 5/00* (2006.01)
*H04L 27/26* (2006.01)
*H04W 76/04* (2009.01)

(52) U.S. Cl.
CPC ........ *H04L 5/0051* (2013.01); *H04L 27/2611* (2013.01); *H04L 27/2657* (2013.01); *H04L 27/2675* (2013.01); *H04W 76/048* (2013.01)

(58) Field of Classification Search
CPC ............... H04L 5/0051; H04L 27/2611; H04L 27/2675; H04L 27/2657; H04W 76/048
See application file for complete search history.

(56) References Cited

U.S. PATENT DOCUMENTS

2011/0268037 A1* 11/2011 Fujimoto ............... H04B 7/043
                                                              370/328
2012/0099730 A1* 4/2012 Nakamura ........ H04W 72/0466
                                                              380/287

(Continued)

OTHER PUBLICATIONS

PCT International Search Report, dated May 28, 2014, in connection with International Application No. PCT/SE2013/050978, all pages.

(Continued)

*Primary Examiner* — Andrew Lai
*Assistant Examiner* — Harry H Kim
(74) *Attorney, Agent, or Firm* — Leffler Intellectual Property Law, PLLC

(57) ABSTRACT

Techniques for facilitating and performing frequency-offset estimation are disclosed. The disclosed techniques include methods and apparatus for maintaining phase coherence among reference symbols on different transmission-time intervals (TTI) for an accurate estimation of frequency offset. Corresponding techniques utilize channel estimation or measurements of channel-related parameters based on multiple reference symbols belonging to different TTIs. An example method in a radio transceiver for facilitating frequency offset estimation at a remote receiver begins with determining that phase coherence between reference symbol transmissions in a first TTI and a second TTI is required. The radio transceiver selectively maintains phase coherence between reference symbol transmissions in the first and second TTIs, in response to said determining. The radio transceiver then transmits during at least part of a third TTI, following the second TTI, without maintaining phase coherence to the reference symbol transmissions in the first and second TTIs.

24 Claims, 3 Drawing Sheets

(56) References Cited

U.S. PATENT DOCUMENTS

2015/0085715 A1* 3/2015 Sun ................... H04B 7/2656
370/280
2015/0215023 A1* 7/2015 Thurfjell ............. H04B 7/046
375/295

OTHER PUBLICATIONS

Alcatel-Lucent Shanghai Bell et al., Discussion of DMRS overhead reduction for small cells, 3GPP TSG RAN WG1 Meeting #72bis, R1-130944, Chicago, USA, Apr. 15-19, 2013, 4 pages.
Research in Motion et al., Small cell spectral efficiency enhancement with reduced UE-specific RS, 3GPP TSG RAN WG1 Meeting #72bis, R1-131346, Chicago, USA, Apr. 15-19, 2013, 7 pages.

* cited by examiner

MAINTAINING PHASE COHERENCE FOR FREQUENCY OFFSET ESTIMATION

TECHNICAL FIELD

The present disclosure is generally related to wireless communications transceivers, and is more particularly related to techniques for facilitating the estimation of frequency offsets in such transceivers.

BACKGROUND

In the Long-Term Evolution (LTE) wireless system standardized by the 3$^{rd}$-Generation Partnership Project, a multi-access technique known as Single Carrier-Frequency Division Multiple Access (SC-FDMA) has been selected for uplink (mobile terminal-to-base station) transmissions. SC-FDCMA combines the desirable characteristics of Orthogonal Frequency Division Multiplexing (OFDM), which is used on the downlink, with a low Peak-to-Average Power Ratio (PAPR). This allows for the design of more efficient power amplifiers in the mobile terminals.

In an SC-FDMA scheme, as in an OFDM scheme, the used bandwidth is divided into a multitude of orthogonal subcarriers. SC-FDMA can be viewed as a Discrete-Fourier-Transform-coded OFDM, where time-domain data symbols are transformed to the frequency domain by a Discrete Fourier Transform (DFT) before going through OFDM modulation. Thus, while in OFDM groups of time-domain bits are mapped directly to one of the several subcarriers in the transmitted signal, in SC-FDMA each group of time-domain bits is spread across (typically) a subset of several subcarriers before the OFDM modulation is performed. This approach produces a single-carrier signal at the output of the SC-FDMA transmitter, rather than the multi-carrier signal of an OFDM transmitter.

Uplink Reference Signals in LTE

The LTE uplink (UL) incorporates two types of reference signals (RSs) for use in coherent data demodulation and channel sounding. These references signals are known as demodulation reference signals (DMRS) and sounding reference signals (SRS). DMRS are intended to be used by the LTE base station (known as an evolved NodeB, or eNB) for channel estimation for coherent demodulation of the uplink physical channels, which include the Physical Uplink Shared Channel (PUSCH) and Physical Uplink Control Channel (PUCCH). Thus, the DMRS is transmitted across the same bandwidth as the corresponding channel. In the case of PUSCH, two symbols per subframe are used for DMRS transmission, where the other symbols are used for PUSCH data transmission. The number of DMRS symbols for PUCCH per subframe depends on the PUCCH format.

In small-cell scenarios, mobile terminals (known as "user equipment" or "UEs" in 3GPP terminology) are expected to experience a relatively small degree of channel selectivity, in both the frequency and time domains. This suggests the possibility of reducing the transmission of DMRS in the uplink, thus reducing overhead and improving spectral efficiency. One approach to overhead reduction is to drop one DMRS symbol per subframe, i.e., using only one DMRS symbol per subframe. This approach is perceived to be a way to achieve higher spectral efficiency for small cell scenarios with reasonable implementation complexity.

SRS are transmitted on the UL to allow the eNodeB to estimate the uplink channel state. An SRS is not necessarily transmitted together with any physical channel. If transmitted together with, for example PUSCH, the SRS may cover a different, typically larger, frequency span. Two types of SRS transmission are defined for LTE uplink: periodic and aperiodic SRS transmission.

Periodic SRS transmissions from a UE occur at regular time intervals. The SRS transmission resources/parameters are semi-statically configured via Radio Resource Control (RRC) signaling. In the specific subframes identified by this configuration, a UE transmits SRS in the last symbol, across the entire frequency band of interest with a single SRS transmission or across part of the band with hopping in the frequency domain.

In contrast, aperiodic SRS are usually "one-shot" transmissions, triggered by signaling sent on the Physical Downlink Control Channel (PDCCH) as part of the scheduling grant. In the same way as for periodic SRS transmission, aperiodic SRS are transmitted within the last symbol of a subframe across the entire frequency band, or across part of the band with frequency hopping. Furthermore, aperiodic SRS transmissions can be configured for a specific UE for a duration N, such that the UE transmits SRS in each of the N next UE-specific SRS subframes. This is referred as "multi-shot" SRS. SRS transmission in multiple subframes may be useful for supporting frequency hopping. Given that a trigger may result in more than one SRS transmission, transmission in consecutive subframes can be considered.

Frequency Offset in LTE

As discussed above, SC-FDMA is used for the LTE uplink. With this scheme, the used bandwidth is divided into a multitude of orthogonal subcarriers. However, the orthogonality of the subcarriers is sensitive to the effects of frequency offset, which is a mismatch between a receiver's reference frequency and the carrier. Frequency offset at the eNodeB can have several causes, including Doppler shift resulting from the mobile terminal's motion, as well as any inaccuracy of the carrier frequency in the UE.

Typically, the mobile terminal locks its oscillator frequency to the downlink signal, which may be affected by a Doppler shift from the mobile terminal's motion. In the uplink, the signal is again subject to a Doppler shift, resulting in twice the frequency offset, compared to the offset in the downlink direction. Thus, the maximum total frequency offset due to the Doppler shift is approximately $$f_{offset} = 2 \times f_d = 2 \frac{v \times f_c}{c},$$

where $f_c$ is the carrier frequency.

According to the 3GPP specification 3GPP TS36.101, the standardized accuracy of the carrier frequency for a UE transmission is ±0.1 ppm, which yields an additional $f_{carrier\_accuracy} = 0.1 \times 10^{-6} \times f_c$ of frequency offset. This must be considered in addition to the Doppler-induced frequency offset. Because these offsets are a fraction of the carrier frequency, at large carrier frequencies the absolute frequency offset can be quite large, relative to the subcarrier spacing.

The effect of the frequency offset is that the subcarriers in the received signal at the eNodeB are no longer orthogonal, which results in inter-subcarrier interference. Especially for small-cell scenarios, where the carrier frequency can be up to 3.5 GHz, it is important to accurately estimate the frequency offset at the network, so that compensation can be performed. Also, channel estimation performance may suffer unless a frequency offset is properly compensated, since the channel will change at a more rapid rate over time than without a frequency offset, thus making channel interpolation more difficult.

Accordingly, consistent and reliable techniques for estimating frequency offset in LIE networks are needed. Furthermore, these techniques must remain consistent and reliable even as the LTE specifications evolve to support new modes of operation.

SUMMARY

Embodiments of the present invention provide methods and apparatus for facilitating frequency-offset estimation, as well as corresponding methods and apparatus for performing frequency-offset estimation. The disclosed methods and apparatus for facilitating frequency-offset estimation include techniques for maintaining phase coherence among reference symbols on different subframes or other transmission-time intervals (TTIs), providing for a more accurate estimation of frequency offset. Likewise, corresponding methods and apparatus utilize channel estimation or estimation of channel-related parameters based on multiple DMRS or SRS belonging to different subframes.

Example embodiments include a method, in a radio transceiver, for facilitating frequency offset estimation at a remote receiver. The example method begins with determining that phase coherence between reference symbol transmissions in a first TTI and a second TTI is required. The first and second TTIs may be subframes in an LTE uplink, for example. The radio transceiver selectively maintains phase coherence between reference symbol transmissions in the first and second TTIs, in response to said determining. The radio transceiver then transmits during at least part of a third TTI, following the second TTI, without maintaining phase coherence to the reference symbol transmissions in the first and second TTIs.

In some embodiments, selectively maintaining phase coherence between reference symbol transmissions in the first and second TTIs includes refraining from discontinuous transmission in the first TTI, or in the second TTI, or in both. In some embodiments, the second TTI immediately follows the first TTI, and selectively maintaining phase coherence between reference symbol transmissions in the first and second TTIs comprises maintaining phase coherence between reference symbol transmission during a first symbol time in the first TTI and reference symbol transmission during a second symbol time in the second TTI by refraining from micro-discontinuous transmission during any symbol times between the first and second symbol times.

In several embodiments, determining that phase coherence between reference symbol transmissions in the first and second TTIs is required comprises receiving radio signaling from a remote node, the radio signaling indicating that phase coherence between reference symbol transmissions in the first and second TTIs is required. In other embodiments, determining that phase coherence between reference symbol transmissions in the first and second TTIs is required comprises determining that the radio transceiver has been granted transmission resources for the first and second TTIs and that the granted transmission resources have the same bandwidth, or the same transmission power, or both. In still other embodiments, determining that phase coherence between reference symbol transmissions in the first and second TTIs is required comprises determining that there is no sounding reference signal (SRS) transmission in the first TTI. In yet other embodiments, determining that phase coherence between reference symbol transmissions in the first and second TTIs is required comprises determining that there is a reduced pattern of DMRS transmission in the first TTI. Combinations of any of these techniques may be used, in some embodiments.

In some embodiments, determining that phase coherence between reference symbol transmissions in the first and second TTIs is required comprises determining that a reduced pattern of demodulation reference symbol transmission applies to transmissions by the radio transceiver and that multi-shot SRS transmission or TTI bundling applies. In these embodiments, selectively maintaining phase coherence between reference symbol transmissions in the first and second TTIs comprises disabling micro-DTX operation during the first TTI or during the second TTI, or both.

Other embodiments include an example method for estimating a frequency offset, as implemented in a radio transceiver, the method complementing the method summarized above. This example method begins with determining that a remote transmitter will maintain phase coherence between reference symbol transmissions in a first TTI and a subsequent, second, TTI. The method also includes receiving transmissions from the remote transmitter in the first and second TTIs. The radio transceiver then estimates a frequency offset, based on first and second measurements of the reference symbol transmissions, where the first and second measurements are taken from the first and second TTIs, respectively.

In some embodiments, determining that the remote transmitter will maintain phase coherence between reference symbol transmissions in the first and second TTIs comprises signaling an instruction to the remote transmitter to maintain phase coherence between reference symbol transmissions in the first and second TTIs. In other embodiments, determining that the remote transmitter will maintain phase coherence between reference symbol transmissions in the first and second TTIs comprises determining that the first and second TTIs correspond to an interval of scheduled phase coherence according to a predetermined rule observed by the remote transmitter. This rule may be set by industry standard, for example. In some embodiments, the predetermined rule specifies periodic intervals of phase coherence.

In some embodiments, determining that the remote transmitter will maintain phase coherence between reference symbol transmissions in the first and second TTIs comprises determining that the remote transmitter has been granted transmission resources for the first and second TTIs and that the granted transmission resources have the same bandwidth, or the same transmission power, or both. In other embodiments, determining that the remote transmitter will maintain phase coherence between reference symbol transmissions in the first and second TTIs comprises determining that there is no sounding reference signal (SRS) transmission in the first TTI. In still other embodiments, determining that the remote transmitter will maintain phase coherence between reference symbol transmissions in the first and second TTIs comprises determining that a reduced pattern of demodulation reference symbols applies to transmissions from the remote transmitter and, in response, scheduling multi-subframe scheduling for the remote transmitter to enable transmissions in the first and second TTIs. In yet other embodiments, determining that the remote transmitter will maintain phase coherence between reference symbol transmissions in the first and second TTIs comprises determining that a reduced pattern of demodulation reference symbols applies to transmissions from the remote transmitter and, in response, triggering multi-shot SRS transmission by the remote transmitter for the first and second TTIs. Combinations of these approaches may be used, in some embodiments.

As detailed further in the description that follows, the methods described above may be implemented using radio circuitry and electronic data processing circuitry provided in a radio transceiver, which may be part of a mobile terminal (such as an LTE UE, for instance) or part of a radio base station (such as an LTE eNB). Thus, other embodiments of the invention include these radio transceivers as well as mobile terminals and base stations that include such radio transceivers.

Of course, the techniques, systems, and apparatus described herein are not limited to the above features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the techniques disclosed herein can additionally be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
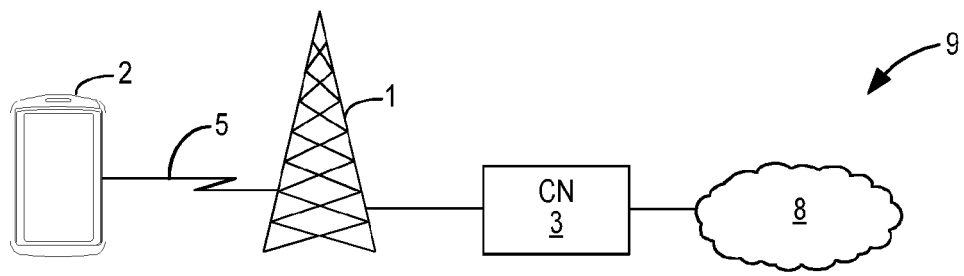
FIG. 1 is a schematic diagram illustrating a portion of a wireless network.

FIG. 1 is a schematic diagram illustrating an environment where the techniques and apparatus presented herein can be applied. A mobile communications network 9 comprises a core network 3 and a radio access network comprising one or more radio base stations 1 and optionally one or more radio network controllers (not shown). The radio base stations 1 are here in the form of evolved Node Bs, also known as eNodeBs or eNBs, but could also be in the form of Node Bs (NodeBs/NBs) and/or BTSs (Base Transceiver Stations) and/or BSSs (Base Station Subsystems), etc. The radio base stations 1 provide radio connectivity to a plurality of wireless devices 2. A wireless device 2 may also be referred to as user equipment (UE), mobile terminal, user terminal, user agent, etc.

Each of the radio base stations 1 provides radio coverage in one or more respective radio cells. Uplink (UL) communication, from the wireless device 2 to the radio base station 1, and downlink (DL) communication, from the radio base station 1 to the wireless device 2, occur over a wireless radio interface 5. The radio conditions of the wireless radio interface 5 vary over time and also depend on the position of the wireless device 2, due to effects such as interference, fading, multipath propagation, etc.

The core network 3 provides access to central functions in the mobile communication network and connectivity to other communication networks 8, such as the Public Switched Telephone Network (PSTN), the Internet, etc.

Mobile communications network 9 may comply with any one or a combination of telecommunications standards, such as those defining LTE (Long Term Evolution), UMTS utilizing W-CDMA (Wideband Code Division Multiplex), CDMA2000 (Code Division Multiple Access 2000), or any other current or future wireless network, as long as the principles described hereinafter are applicable. Nevertheless, LTE will be used below to fully illustrate a context in which embodiments presented herein can be applied. Thus, although terminology from 3GPP LTE is used in the present disclosure to exemplify the inventive techniques described herein, this should not be seen as limiting the scope of the inventive concepts to only the aforementioned system. Other wireless systems, including WCDMA, WiMAX, and UMB, may also benefit from exploiting the ideas covered within this disclosure. Furthermore, even within the context of an LTE system, the techniques may be more broadly applied than the specific examples given herein. For instance, the following techniques and principles are not only applicable to the Physical Uplink Shared Channel (PUSCH), but can also be applied to PUCCH and other channels and signals.

Also note that the use of terminology such as base station/eNodeB and UE/mobile terminal should be considered non-limiting with respect to the inventive concepts and techniques presented herein, and does not necessarily imply a certain hierarchical relation between two or more devices. Unless the context clearly indicates otherwise, in general "eNodeB" could be considered as device 1 and "UE" could be considered as device 2, where these two devices communicate with each other over some radio channel.

In the discussion that follows, techniques for facilitating the estimation of frequency offset in a wireless communication network will be illustrated in detail by a number of exemplary embodiments. It should be noted, however, that these embodiments are not mutually exclusive. Components from one embodiment may be tacitly assumed to be present in another embodiment and it will be obvious to a person skilled in the art how those components may be used in the other exemplary embodiments.

DTX

Discontinuous transmission (DTX) is a mechanism that allows the mobile terminal to transmit only at well-defined time instants, while switching off at least its power amplifier (PA) between these transmissions. The purpose is to reduce the power consumption of the UE transmitter, which is important for extending the operation time of battery-powered mobile phones.

DTX can be performed on different time-scales, where typically the PA is turned off for intervals measured in subframes, during which the UE has no scheduled transmissions. However, it is also possible for DTX to be performed at an OFDM symbol level, which allows the UE to conserve power during the periods of a subframe in which it does not have any transmission activity. This approach is often referred to as micro DTX. For example, if a UE is scheduled to transmit SRS in a given subframe, but no data, then the UE can be in DTX mode, and thus shut its power amplifier down, in all OFDM symbols except for the symbol in which the SRS transmission occurs.

Problems with Existing Solutions

One way for the eNodeB to estimate the frequency offset in a received UE transmission is to calculate the phase difference between measurements (e.g., instantaneous channel estimates) obtained from two subsequent DMRS symbols within a single subframe on the uplink. However, to improve spectral efficiency, one of the two DMRS symbols can be removed, to reduce the DMRS overhead. Such a reduced overhead DMRS pattern is particularly suitable for small-cell operation, where it is expected that UE mobility is very low, that is, where it is expected that the underlying radio channel is relatively stationary throughout the duration of a subframe. However, if such a reduced DMRS pattern is applied, i.e., if one DMRS is dropped, then the aforementioned frequency offset estimation on a single subframe can no longer be applied. Accordingly, frequency offset estimation must be performed across two or more successive subframes.

In order to measure frequency offset by comparing the phase of reference symbols in two different subframes, it is necessary that there be phase coherency between the reference symbol transmissions in the two subframes. "Phase coherency" between two subframes here means that the underlying carrier signal for the reference symbol transmissions in the two subframes can be regarded as a continuous signal, such that, given perfect knowledge of the carrier signal frequency, the phase of the carrier signal at a given point in one subframe can be accurately predicted from the phase of the carrier signal at a given point in the other subframe. It will be appreciated that an assumption of phase coherence between two subframes at the transmitter end of a link is necessary if a frequency offset is to be measured using reference symbols from the two different subframes at the receiver end.

However, currently there are no requirements for preserving phase coherency between reference symbol transmissions in two successive uplink subframes in the 3GPP specifications for LTE. Therefore, there is an uncertainty with respect to the UE's behavior regarding phase coherence, and eNB cannot assume good phase coherence on UE's transmission for different subframes. This situation is exacerbated by the introduction of a DTX interval between the subframes from which measurements are to be taken. Because all or part of a transmitter circuit is turned off during a DTX interval, the phase relationship between a preceding and succeeding transmit time interval may be completely arbitrary.

Detailed below are methods and apparatus for facilitating accurate frequency offset estimation at the eNodeB, especially for small-cell scenarios. The disclosed techniques enable channel estimation or estimation of channel related parameters based on multiple DMRS or SRS belonging to different subframes. More particularly, techniques are described for maintaining phase coherence among these reference symbols on different subframes, for an accurate estimation of frequency offset.

According to some of the techniques and apparatus detailed below, an eNB signals to a UE that the UE should maintain phase coherence, at least for a first antenna port, between at least a first and a second subframe. In many cases, these first and second subframes may be consecutive subframes, although some embodiments may specify and/or require phase coherence for a longer interval.

Alternatively, according to some embodiments of the present techniques there may be a standardized "contract" between an eNB and a UE that the UE should maintain phase coherence between reference symbol transmissions in a particular pair of subframes. This contract may arise from a system specification, or from a semi-static or static configuration of the UE and/or eNodeB, or some combination of both.

In either case, the UE need not maintain phase coherence between reference symbol transmissions in the first subframe and a third subframe following the second subframe. Thus, the UE may perform more aggressive micro DTX in said third subframe than in said first and second subframes, for example.

In other variants of these techniques, the UE selectively maintains phase coherence between reference symbol transmissions in the first and second subframes of interest based on other factors, e.g., in addition to or instead of merely responding to system signaling. In one example, the UE only has to maintain phase coherence between reference symbol transmissions in said first and second subframe if it is granted the same transmission bandwidth and/or the same transmission power (e.g., of the PUSCH) in the two subframes. Thus, a UE according to this embodiment determines whether the same transmission bandwidth and/or transmission applies to two subframes and, if so, maintains phase coherence between them. In another example, the UE only has to maintain phase coherence reference symbol transmissions in between said first and second subframe in the event that there is no SRS transmission in said first subframe.

As noted above, an eNB in some embodiments dynamically signals to a UE that phase coherence shall be preserved between said reference symbol transmissions in first and second subframes. In some embodiments, this signaling may be derived from a message indicated in a downlink control information (DCI) message. For example, there can be a bit in an uplink grant format that indicates that coherence shall be preserved from the granted first subframe to a subsequent second subframe, or it can be indicated that coherence shall be preserved in a granted second subframe from a preceding first subframe. In some embodiments, the identity of the second subframe may be determined based on when an uplink grant subsequent to the first uplink grant is received, e.g. the "next" uplink grant.

In still other embodiments, a UE is configured to maintain coherence between reference symbol transmissions in a first and a second subframe on a periodic basis. For example, the reference symbol transmissions in two subsequent subframes can maintain phase coherence once every Nth subframe. N can be fixed by a standard, for example, or may be configurable by an eNB, e.g., by RRC/MAC signaling.

In other embodiments the phase coherence between reference symbol transmissions in the at least two subframes is only guaranteed if a particular triggering criterion is satisfied. In one such embodiment, the maintaining of phase coherence between subframes is triggered if a UE receives grant(s) for M (e.g., M=2) consecutive subframes (for example PUSCH grants and/or aperiodic SRS grants). In a further such embodiment, the maintaining of phase coherence is only triggered if, in addition to the immediately preceding criterion, the previously triggered instance of guaranteed phase coherence occurred at least N subframes prior to current subframe. In yet another such embodiment, the coherence between subframes is maintained during a specified time-period when it is triggered, e.g., for two or three subframes. In still other embodiments, the coherence between subframes is maintained for M subframes, where M may be specified by standards or may be signaled to the UE by the eNB.

The preceding summary has focused on embodiments implemented in a UE. There are corresponding embodiments implemented in an eNB. In several embodiments in an eNB, the eNB determines that a remote transmitter will maintain phase coherence between reference symbol transmissions in first and second subframes and then performs first and second phase-related measurements in the first and second subframes, respectively. The eNB then estimates a frequency offset based, at least in part, on said measurements. In a variant of these embodiments the eNB performs a frequency-offset estimation based on a deviation from a nominal expected (wideband) phase difference between the first and second measurements, or based on an estimate of a correlation over time of channel estimates or received reference symbols.

In a further refinement of such embodiments, the eNB performs first and second channel estimation on said first and second measurements, and estimates a frequency offset based, at least in part, on an estimated (wideband) phase difference between the first and second channel estimates. In some embodiments, the first and/or second measurements are performed on a DMRS. In some embodiments, the first and/or second measurement is performed on a SRS. It is preferable, but not essential, that the first and second measurements are performed on the same type of reference signal (e.g., both measurements are on DMRS; alternatively both measurements are on SRS).

It will be appreciated that while the preceding discussion and much of the following discussion refers to "subframes," the techniques are more generally applicable to any type of transmission-time interval (TTI), whatever its name. Likewise, while the detailed description provided herein generally assumes that it is a mobile terminal (e.g., an LTE UE) that is selectively maintaining phase coherence between two TTIs and that it is a base station (e.g., an LTE eNB) that is performing the frequency offset estimation, it should be understood that the techniques are more generally applicable to any of a variety of links between a pair of radio transceivers, where at least one of the radio transceivers selectively maintains phase coherence between two TTIs according to the techniques disclosed herein, while the transceiver or transceivers at the other end(s) of the link(s) performs frequency-offset estimation.

Following are further details for two implementations of the techniques summarized above. Again, while these details are presented in the context of the uplink for an LTE system, it should be understood that the detailed techniques are more generally applicable.

Example Implementation 1

According to this first example approach, frequency offset estimation is based on DMRS measurements from two different subframes, in the event that DMRS symbols are dropped from one or more subframes. In a first example, in the event that a reduced DMRS pattern, i.e., dropping one of the DMRS symbol per subframe, is applied for multiple uplink subframes, the frequency offset estimation is done at the eNB by estimating the phase difference between the channel experienced by two DMRS symbols belonging to different subframes. This can be done, for example by calculating the phase difference between two reference symbol measurements or by first estimating a correlation between said measurements and obtaining the phase difference from that correlation.

Alternatively, the phase estimation could be done based on SRS in the uplink and then used for frequency offset estimation. In other words, the eNB calculates the phase difference between the phase-related measurements on two SRS symbols belonging to different subframes, and then estimates the frequency offset.

Figure 2:
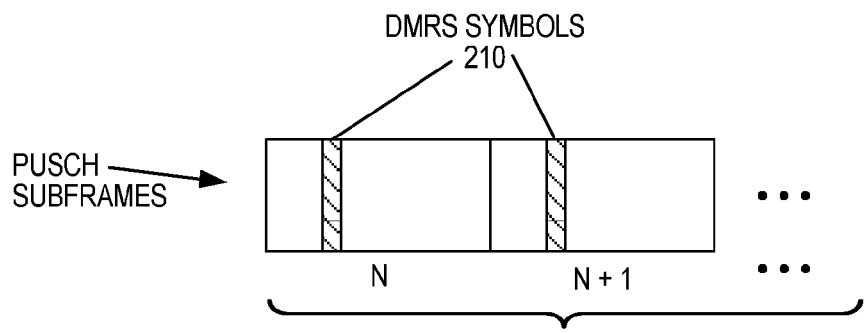
FIG. 2 illustrates the use of DMRS symbols in different subframes to perform frequency-offset estimation.
Figure 3:
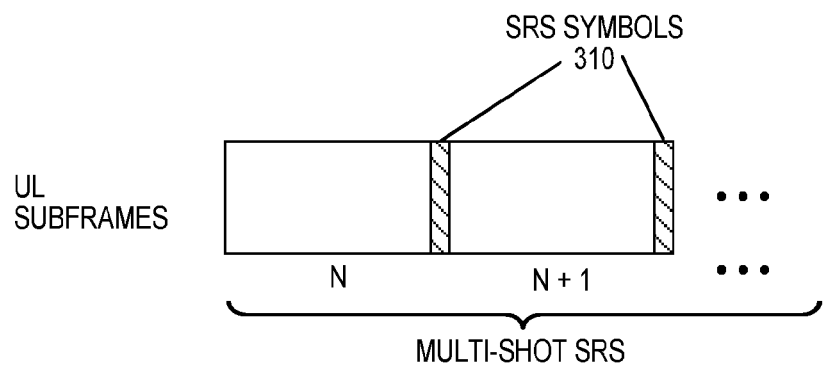
FIG. 3 illustrates the use of SRS symbols in different subframes to perform frequency-offset estimation.

In another example, in the event that a reduced DMRS pattern is applied, eNB performs multi-subframe scheduling to enable UE transmissions on multiple consecutive subframes. The configuration is sent to UE on the Physical Downlink Control Channel (PDCCH) as part of a scheduling grant. Then, the eNB estimates frequency offset based on the received signal corresponding to DMRS on consecutive subframes. FIG. 2 illustrates this approach, and shows that the frequency offset is estimated by calculating the phase difference between a reference symbol measurement for subframe N and a reference symbol measurement for subframe N+1, using a single DMRS symbol 210 for each subframe.

In a further example, in the event that a reduced DMRS pattern is applied, the Physical Uplink Shared Channel (PUSCH) transmission from the UE might be scheduled on a given bandwidth in multiple, possibly consecutive, subframes. When TTI bundling is applied, the phase difference between reference symbol measurements on two or more consecutive subframes can be calculated for frequency offset estimation at the eNB.

Example Implementation 2

According to another group of embodiments, in the event that a UE is configured with reduced DMRS pattern for PUSCH data transmission, a sequence of multi-shot SRS transmissions is triggered by the eNB, using signaling on PDCCH as part of the scheduling grant. After receiving the grant, the UE transmits SRS symbols 310 on multiple subframes, as shown in in FIG. 2. At the eNB side, phase-related measurements (e.g., channel estimation) can be done on multiple SRS symbols 310, thus facilitating frequency offset estimation using similar methods to those described for example implementation 1, above.

Example Implementation 3

Figure 4:
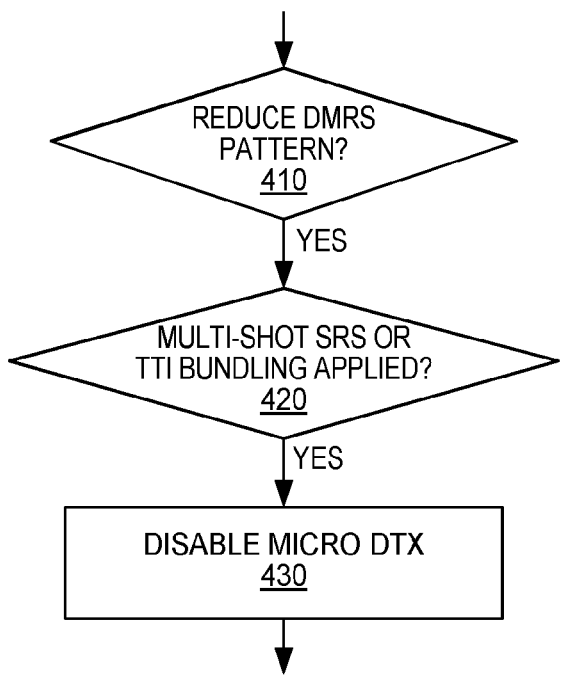
FIG. 4 is a process flow diagram illustrating a method for facilitating frequency-offset estimation.

According to another group of embodiments, in the event that a reduced DMRS pattern is utilized, when multi-shot SRS or TTI bundling is triggered, the UE refrains from performing micro DTX, to avoid affecting phase coherency. This is shown in FIG. 4, which is a process flow diagramming illustrating this procedure in a mobile terminal.

As shown at block 410, the UE first determines whether a reduced DMRS pattern is being utilized. If so, the UE determines whether multi-shot SRS or TTI bundling is applicable, as shown at block 420. If so, the UE disables micro DTX, as shown at block 430.

In another example, in case reduced DMRS pattern is utilized, when multi-shot SRS or TTI bundling is triggered, the UE automatically disables DTX of any kind, to avoid affecting phase coherency.

In a further example, the network informs UE in which cases coherence between reference symbol (i.e. DMRS or SRS) in different subframes needs to be preserved, via higher layer signaling or dynamic signaling. Accordingly, the UE selectively disables DTX or micro DTX, in response to the information provided by the network.

Figure 5:
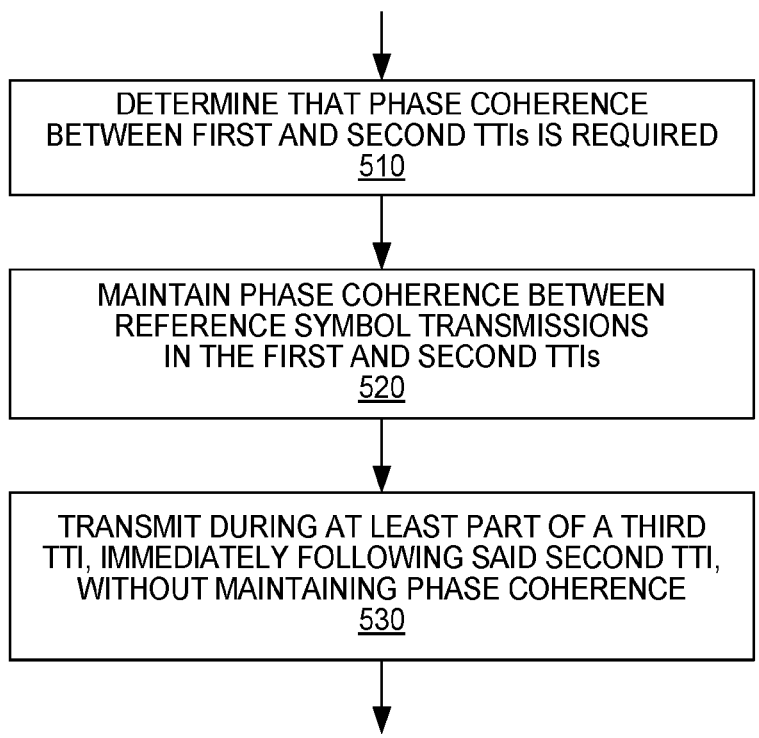
FIG. 5 is another process flow diagram illustrating a method for facilitating frequency-offset estimation.
Figure 6:
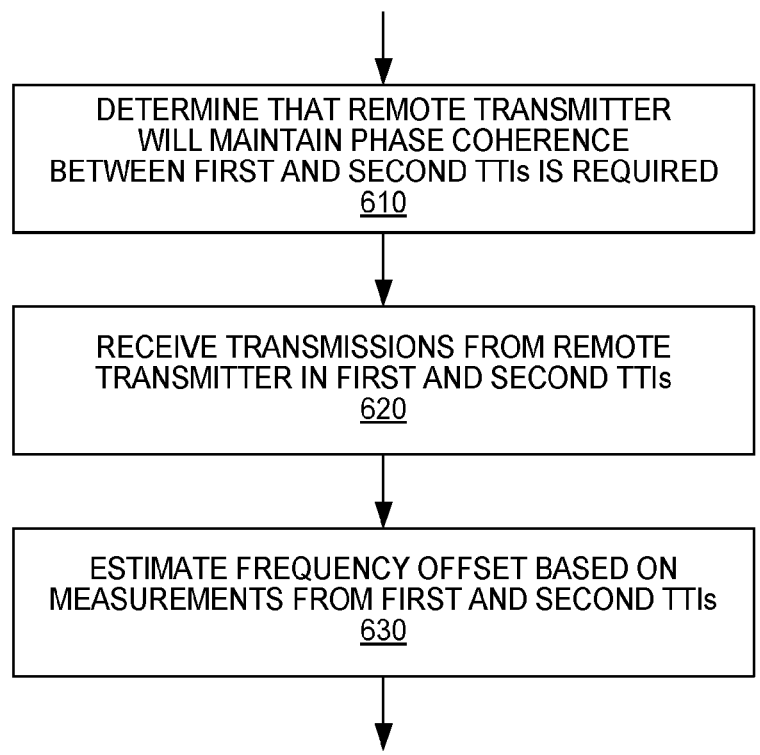
FIG. 6 is a process flow diagram illustrating a method for performing frequency-offset estimation.

With the above detailed discussion in mind, it will be appreciated that FIGS. 5 and 6 illustrated generalized procedures for facilitating frequency-offset estimation and for performing frequency-offset estimation, respectively. Although not limited to this context, these procedures, and variants thereof, might be carried out in a LTE UE and eNB, for example.

More particularly, FIG. 5 illustrates a method, in a radio transceiver, for facilitating frequency offset estimation at a remote receiver. As shown at block 510, the illustrated procedure begins with determining that phase coherence between reference symbol transmissions in a first TTI and a second TTI is required. As shown at block 520, the radio transceiver then selectively maintains phase coherence between reference symbol transmissions in the first and second TTIs, in response to said determining. The radio transceiver then transmits during at least part of a third TTI, following the second TTI, without maintaining phase coherence to the reference symbol transmissions in the first and second TTIs. This is shown at block 530.

In some embodiments, selectively maintaining phase coherence between reference symbol transmissions in the first and second TTIs includes refraining from discontinuous transmission in the first TTI, or in the second TTI, or in both. In some embodiments, the second TTI immediately follows the first TTI, and selectively maintaining phase coherence between reference symbol transmissions in the first and second TTIs comprises maintaining phase coherence between transmission during a first symbol time in the first TTI and transmission during a second symbol time in the second TTI, by refraining from micro-discontinuous transmission during any symbol times between the first and second symbol times.

In several embodiments, determining that phase coherence between reference symbol transmissions in the first and second TTIs is required comprises receiving radio signaling from a remote node, the radio signaling indicating that phase coherence between reference symbol transmissions in the first and second TTIs is required. In other embodiments, determining that phase coherence between reference symbol transmissions in the first and second TTIs is required comprises determining that the radio transceiver has been granted transmission resources for the first and second TTIs and that the granted transmission resources have the same bandwidth, or the same transmission power, or both. In still other embodiments, determining that phase coherence between reference symbol transmissions in the first and second TTIs is required comprises determining that there is no sounding reference signal (SRS) transmission in the first TTI. In yet other embodiments, determining that phase coherence between reference symbol transmissions in the first and second TTIs is required comprises determining that there is a reduced pattern of DMRS transmission in the first TTI. Combinations of any of these techniques may be used, in some embodiments.

In some embodiments, determining that phase coherence between reference symbol transmissions in the first and second TTIs is required comprises determining that a reduced pattern of demodulation reference symbols applies to transmissions by the radio transceiver and that multi-shot SRS transmission or TTI bundling applies. In these embodiments, selectively maintaining phase coherence between reference symbol transmissions in the first and second TTIs comprises disabling micro-DTX operation during the first TTI or during the second TTI, or both.

FIG. 6 is a process flow diagram illustrating a procedure for estimating a frequency offset, as implemented in a radio transceiver. The method shown in FIG. 6 complements the method shown in FIG. 5 in that it is suitable for implementation at the other end of a radio link from the radio transceiver implementing the procedure of FIG. 5.

As shown at block 610, the illustrated method begins with determining that a remote transmitter will maintain phase coherence between reference symbol transmissions in a first TTI and a subsequent, second, TTI. The method also includes receiving transmissions from the remote transmitter in the first and second TTIs, as shown at block 620. The radio transceiver then estimates a frequency offset, as shown at block 630, based on first and second measurements of the transmissions, where the first and second measurements are taken from the first and second TTIs, respectively.

In some embodiments, determining that the remote transmitter will maintain phase coherence between reference symbol transmissions in the first and second TTIs comprises signaling an instruction to the remote transmitter to maintain phase coherence between reference symbol transmissions in the first and second TTIs. In other embodiments, determining that the remote transmitter will maintain phase coherence between reference symbol transmissions in the first and second TTIs comprises determining that the first and second TTIs correspond to an interval of scheduled phase coherence according to a predetermined rule observed by the remote transmitter. This rule may be set by industry standard, for example. In some embodiments, the predetermined rule specifies periodic intervals of phase coherence.

In some embodiments, determining that the remote transmitter will maintain phase coherence between reference symbol transmissions in the first and second TTIs comprises determining that the remote transmitter has been granted transmission resources for the first and second TTIs and that the granted transmission resources have the same bandwidth, or the same transmission power, or both. In other embodiments, determining that the remote transmitter will maintain phase coherence between reference symbol transmissions in the first and second TTIs comprises determining that there is no sounding reference signal (SRS) transmission in the first TTI. In still other embodiments, determining that the remote transmitter will maintain phase coherence between reference symbol transmissions in the first and second TTIs comprises determining that a reduced pattern of demodulation reference symbols applies to transmissions from the remote transmitter and, in response, scheduling multi-subframe scheduling for the remote transmitter to enable transmissions in the first and second TTIs. In yet other embodiments, determining that the remote transmitter will maintain phase coherence between reference symbol transmissions in the first and second TTIs comprises determining that a reduced pattern of demodulation reference symbols applies to transmissions from the remote transmitter and, in response, triggering multi-shot SRS transmission by the remote transmitter for the first and second TTIs. Combinations of these approaches may be used, in some embodiments.

Figure 7:
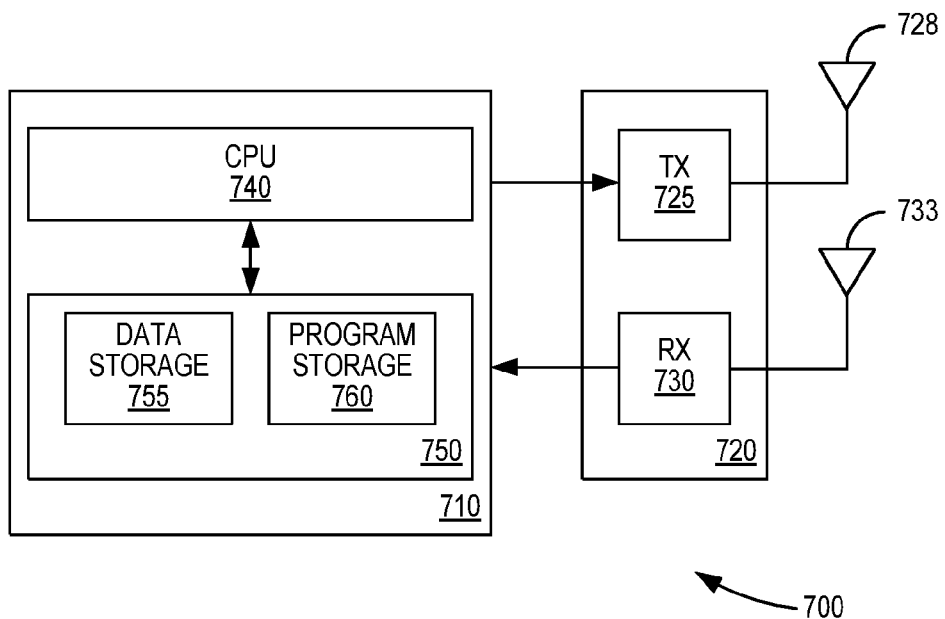
FIG. 7 is a block diagram illustrating components of an example radio transceiver.

The techniques and methods described above may be implemented using radio circuitry and electronic data processing circuitry provided in a radio transceiver, which may comprise part of a mobile terminal (such as an LTE UE, for instance) or part of a radio base station (such as an LTE eNB). FIG. 7 illustrates features of an example radio transceiver 1500 according to several embodiments of the present invention. Radio transceiver 1500 comprises radio circuitry 1520 for communicating with one or more remote transceivers over a radio link, as well as a processing circuit 1510 for processing the signals transmitted and received by the radio circuitry 1520. Radio circuitry 1520 includes a transmitter 1525 coupled to one or more transmit antennas 1528 and receiver 1530 coupled to one or more receiver antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE. Note also that receiver 1530 and/or transmitter 1525 may comprise separate radio and/or baseband circuitry for each of two or more different types of radio access network, such as radio/baseband circuitry adapted for E-UTRAN access and separate radio/baseband circuitry adapted for WiFi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 1510 comprises one or more processors 1540 coupled to one or more memory devices 1550 that make up a data storage memory 1555 and a program storage memory 1560. Processor 1540, identified as CPU 1540 in FIG. 16, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Where radio transceiver 1500 is configured to operate with multiple radio access networks, processing circuit 1510 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 1510 include modulation and coding of transmitted signals and the demodulation and decoding of received signals. In several embodiments of the present invention, processing circuit 1510 is adapted, using suitable program code stored in program storage memory 1560, for example, to carry out one or more of the techniques described above for facilitating frequency-offset estimation or performing frequency-offset estimation. Of course, it will be appreciated that not all of the steps of these techniques are necessarily performed in a single microprocessor or even in a single module.

More particularly, in some embodiments radio transceiver 1500 is configured to facilitate frequency-offset estimation according to one of the techniques shown in the process flow diagram of FIG. 5. In these embodiments, radio transceiver 1500 comprises radio-frequency (RF) circuitry 1520 configured to transmit radio signals to a remote node and to receive signals from the remote node, and a processing circuit 1510 configured to control the RF circuitry. The processing circuit 1510 is further configured to: determine that phase coherence between reference symbol transmissions in a first TTI and a second TTI is required; control the RF circuitry 1520 to selectively maintain phase coherence between reference symbol transmissions in the first and second TTIs, in response to said determining; and control the RF circuitry 1520 to transmit during at least part of a third TTI, following said second TTI, without maintaining phase coherence to the reference symbol transmissions in the first and second TTIs. All the variants discussed above in connection with FIG. 5 are likewise applicable to these embodiments of radio transceiver 1500. For example, in some embodiments the processing circuit 1510 is configured to control the RF circuitry 1520 to selectively maintain phase coherence between reference symbol transmissions in the first and second TTIs by refraining from discontinuous transmission in the first TTI, or in the second TTI, or in both. In some embodiments, the processing circuit 1510 is configured to determine that phase coherence between reference symbol transmissions in the first and second TTIs is required by receiving radio signaling from a remote node, the radio signaling indicating that phase coherence between reference symbol transmissions in the first and second TTIs is required.

In other embodiments, radio transceiver 1500 is configured to perform frequency-offset estimation. In these embodiments, radio transceiver also includes RF circuitry 1520 configured to transmit radio signals to a remote node and to receive signals from the remote node, and a processing circuit 1510 configured to control the RF circuitry 1520. In these embodiments, however, the processing circuit 1510 is further configured to: determine that a transmitter of the remote node will maintain phase coherence between reference symbol transmissions in a first transmission time interval (TTI) and a subsequent second TTI; control the RF circuitry (1520) to receive transmissions from the transmitter in the first and second TTIs; and estimating a frequency offset based on first and second measurements of the transmissions, where the first and second measurements are taken from the first and second TTIs, respectively. All the variants discussed above in connection with FIG. 6 are likewise applicable to these embodiments of radio transceiver 1500. For example, in some embodiments the processing circuit 1510 is configured to determine that the remote transmitter will maintain phase coherence between the first and second TTIs by signaling an instruction to the remote transmitter to maintain phase coherence between reference symbol transmissions in the first and second TTIs. In some embodiments, the processing circuit 1510 is configured to determine that the remote transmitter will maintain phase coherence between reference symbol transmissions in the first and second TTIs by determining that the first and second TTIs correspond to an interval of scheduled phase coherence according to a predetermined rule observed by the remote transmitter. In some embodiments the processing circuit 1510 is configured to determine that the remote transmitter will maintain phase coherence between reference symbol transmissions in the first and second TTIs by determining that a reduced pattern of demodulation reference symbols applies to transmissions from the remote transmitter and, in response, scheduling multi-subframe scheduling for the remote transmitter to enable transmissions in the first and second TTIs. Likewise, in some embodiments the processing circuit 1510 is configured to determine that the remote transmitter will maintain phase coherence between reference symbol transmissions in the first and second TTIs by determining that a reduced pattern of demodulation reference symbols applies to transmissions from the remote transmitter and, in response, triggering multi-shot SRS transmission by the remote transmitter for the first and second TTIs.

Through the techniques and apparatus described herein, a radio network can accurately estimate frequency offset for small cell scenarios applying reduced DMRS pattern, i.e., where one DMRS symbol is dropped from subframes transmitted in the uplink. With an accurate estimation and corresponding compensation of frequency offset at the network, a robust performance and high throughput can be achieved.

With these and other variations and extensions in mind, those skilled in the art will appreciate that the foregoing description and the accompanying drawings represent non-limiting examples of the systems and apparatus taught herein for facilitating frequency-offset estimation and performing frequency-offset estimation in a wireless communications network. As such, the present invention is not limited by the foregoing description and accompanying drawings. Instead, the present invention is limited only by the following claims and their legal equivalents.

What is claimed is:

1. A method, in a radio transceiver, for facilitating frequency offset estimation at a remote receiver, characterized in that the method comprises:
   determining that phase coherence between reference symbol transmissions in a first transmission time interval (TTI) and in a second TTI is required;
   selectively maintaining phase coherence between reference symbol transmissions in the first and second TTIs, in response to said determining; and
   transmitting a signal during at least part of a third TTI, following said second TTI, without maintaining phase coherence to the reference symbol transmissions in the first and second TTIs.

2. The method of claim 1, wherein selectively maintaining phase coherence between reference symbol transmissions in the first and second TTIs comprises refraining from discontinuous transmission (DTX) in the first TTI, or in the second TTI, or in both.

3. The method of claim 1, wherein the second TTI immediately follows the first TTI, and wherein selectively maintaining phase coherence between reference symbol transmissions in the first and second TTIs comprises maintaining phase coherence between reference symbol transmission during a first symbol time in the first TTI and reference symbol transmission during a second symbol time in the second TTI by refraining from micro-discontinuous transmission during any symbol times between the first and second symbol times.

4. The method of claim 1, wherein determining that phase coherence between reference symbol transmissions in the first and second TTIs is required comprises receiving radio signaling from a remote node, the radio signaling indicating that phase coherence between the first and second TTIs is required.

5. The method of claim 1, wherein determining that phase coherence between reference symbol transmissions in the first and second TTIs is required comprises determining that the radio transceiver has been granted transmission resources for the first and second TTIs and that the granted transmission resources have the same bandwidth, or the same transmission power, or both.

6. The method of claim 1, wherein determining that phase coherence between reference symbol transmissions in the first and second TTIs is required comprises determining that there is no sounding reference signal (SRS) transmission in the first TTI.

7. The method of claim 1, wherein determining that phase coherence between reference symbol transmissions in the first and second TTIs is required comprises determining that there is a reduced pattern of demodulation reference symbol (DMRS) transmission.

8. The method of claim 1, wherein determining that phase coherence between reference symbol transmissions in the first and second TTIs is required comprises determining that a reduced pattern of DMRS applies to transmissions by the radio transceiver and that multi-shot SRS transmission or TTI bundling applies, and wherein selectively maintaining phase coherence between reference symbol transmissions in the first and second TTIs comprises disabling micro-DTX operation during the first TTI or during the second TTI, or both.

9. A method, in a radio transceiver, for frequency offset estimation, characterized in that the method comprises:
   operating the radio transceiver in a manner that does not assume phase coherence between transmissions made during successive transmission time intervals by a remote transmitter;
   determining that the remote transmitter will maintain phase coherence between reference symbol transmissions in a first transmission time interval (TTI) and a subsequent second TTI;
   receiving transmissions from the remote transmitter in the first and second TTIs; and
   estimating a frequency offset based on first and second measurements of the transmissions, wherein the first and second measurements are taken from the first and second TTIs, respectively.

10. The method of claim 9, wherein determining that the remote transmitter will maintain phase coherence between reference symbol transmissions in the first and second TTIs comprises signaling an instruction to the remote transmitter to maintain phase coherence between reference symbol transmissions in the first and second TTIs.

11. The method of claim 9, wherein determining that the remote transmitter will maintain phase coherence between reference symbol transmissions in the first and second TTIs comprises determining that the first and second TTIs correspond to an interval of scheduled phase coherence according to a predetermined rule observed by the remote transmitter.

12. The method of claim 11, wherein the predetermined rule specifies periodic intervals of phase coherence.

13. The method of claim 9, wherein determining that the remote transmitter will maintain phase coherence between reference symbol transmissions in the first and second TTIs comprises determining that the remote transmitter has been granted transmission resources for the first and second TTIs and that the granted transmission resources have the same bandwidth, or the same transmission power, or both.

14. The method of claim 9, wherein determining that the remote transmitter will maintain phase coherence between reference symbol transmissions in the first and second TTIs comprises determining that there is no sounding reference signal (SRS) transmission in the first TTI.

15. The method of claim 9, wherein determining that the remote transmitter will maintain phase coherence between reference symbol transmissions in the first and second TTIs comprises determining that a reduced pattern of demodulation reference symbols applies to transmissions from the remote transmitter and, in response, scheduling multi-TTI scheduling for the remote transmitter to enable transmissions in the first and second TTIs.

16. The method of claim 9, wherein determining that the remote transmitter will maintain phase coherence between reference symbol transmissions in the first and second TTIs comprises determining that a reduced pattern of demodulation reference symbols applies to transmissions from the remote transmitter and, in response, triggering multi-shot SRS transmission by the remote transmitter for the first and second TTIs.

17. A radio transceiver, comprising
radio-frequency (RF) circuitry configured to transmit radio signals to a remote node and to receive signals from the remote node, and
a processing circuit configured to control the RF circuitry, wherein the processing circuit is characterized in that it is further configured to:
determine that phase coherence between reference symbol transmissions in a first transmission time interval (TTI) and in a second TTI is required;
control the RF circuitry to selectively maintain phase coherence between reference symbol transmissions in the first and second TTIs, in response to said determining; and
control the RF circuitry to transmit a signal during at least part of a third TTI, following said second TTI, without maintaining phase coherence to the reference symbol transmissions in the first and second TTIs.

18. The radio transceiver of claim 17, wherein the processing circuit is configured to control the RF circuitry to selectively maintain phase coherence between reference symbol transmissions in the first and second TTIs by refraining from discontinuous transmission in the first TTI, or in the second TTI, or in both.

19. The radio transceiver of claim 17, wherein the processing circuit is configured to determine that phase coherence between reference symbol transmissions in the first and second TTIs is required by receiving radio signaling from a remote node, the radio signaling indicating that phase coherence between reference symbol transmissions in the first and second TTIs is required.

20. A radio transceiver, comprising
radio-frequency (RF) circuitry configured to transmit radio signals to a remote node and to receive signals from the remote node, and
a processing circuit configured to control the RF circuitry, wherein the processing circuit is characterized in that it is further configured to:
operate the radio transceiver in a manner that does not assume phase coherence between transmissions made during successive transmission time intervals by the remote node;
determine that a transmitter of the remote node will maintain phase coherence between reference symbol transmissions in a first transmission time interval (TTI) and a subsequent second TTI;
control the RF circuitry to receive transmissions from the transmitter in the first and second TTIs; and
estimate a frequency offset based on first and second measurements of the transmissions, wherein the first and second measurements are taken from reference symbols in the first and second TTIs, respectively.

21. The radio transceiver of claim 20, wherein the processing circuit is configured to determine that the remote transmitter will maintain phase coherence between reference symbol transmissions in the first and second TTIs by signaling an instruction to the remote transmitter to maintain phase coherence between reference symbol transmissions in the first and second TTIs.

22. The radio transceiver of claim 20, wherein the processing circuit is configured to determine that the remote transmitter will maintain phase coherence between reference symbol transmissions in the first and second TTIs by determining that the first and second TTIs correspond to an interval of scheduled phase coherence according to a predetermined rule observed by the remote transmitter.

23. The radio transceiver of claim 20, wherein the processing circuit is configured to determine that the remote transmitter will maintain phase coherence between reference symbol transmissions in the first and second TTIs by determining that a reduced pattern of demodulation reference symbols applies to transmissions from the remote transmitter and, in response, scheduling multi-TTI scheduling for the remote transmitter to enable transmissions in the first and second TTIs.

24. The radio transceiver of claim 20, wherein the processing circuit is configured to determine that the remote transmitter will maintain phase coherence between reference symbol transmissions in the first and second TTIs by determining that a reduced pattern of demodulation reference symbols applies to transmissions from the remote transmitter and, in response, triggering multi-shot SRS transmission by the remote transmitter for the first and second TTIs.

* * * * *